United States Patent [19]

Nomine et al.

[11] 4,296,081

[45] Oct. 20, 1981

[54] PROCESS FOR PURIFYING GASEOUS EFFLUENTS

[75] Inventors: Michel Nomine; Gerard Chelu, both of Verneuil-en-Halatte, France

[73] Assignee: Charbonnages de France, France

[21] Appl. No.: 117,674

[22] Filed: Feb. 1, 1980

[30] Foreign Application Priority Data

Feb. 8, 1979 [FR] France ............................. 79 03249

[51] Int. Cl.$^3$ ........................................... B01D 53/34
[52] U.S. Cl. .................................. 423/245; 423/238; 423/242; 585/857; 585/861
[58] Field of Search ............... 423/210, 245, 242, 238; 585/857, 861

[56] References Cited

U.S. PATENT DOCUMENTS

| | | | |
|---|---|---|---|
| 2,110,971 | 3/1938 | Carter ................................. | 423/245 |
| 2,460,056 | 1/1948 | Yowell et al. ....................... | 423/245 |
| 3,909,408 | 9/1975 | Ishida et al. ........................ | 210/18 |
| 4,158,045 | 6/1979 | Schaffer et al. .................... | 423/245 |

FOREIGN PATENT DOCUMENTS

| | | | |
|---|---|---|---|
| 2719022 | 8/1978 | Fed. Rep. of Germany ...... | 423/245 |
| 2126412 | 10/1972 | France ................................. | 423/245 |
| 2128955 | 10/1972 | France ................................. | 423/242 |

OTHER PUBLICATIONS

Dickerson et al., "Scope of Wet Scrubbers for Odor Control", Annals of the New York Academy of Sciences, vol. 237, pp. 374—388, 1974.

*Primary Examiner*—Earl C. Thomas
*Attorney, Agent, or Firm*—Karl W. Flocks

[57] ABSTRACT

A process for purifying gaseous effluents containing aldehydes comprises submitting the gaseous effluents to the simultaneous action of $SO_2$ and $NH_3$ followed by washing with water. The ratio of the required quantities of $NH_3$ and $SO_2$ is between 2:1 and 3:1.

When the gas to be purified naturally contains $NH_3$, as is for instance the case in rendering plants, the quantity of $NH_3$ to be added to the gas is reduced accordingly. Conversely when the gas to be treated naturally contains $SO_2$, the quantity of $SO_2$ to be added to the gas is also reduced accordingly. The most favorable ratio would correspond to a pH of the washing waters of between 7 and 7.5. ;

10 Claims, No Drawings

PROCESS FOR PURIFYING GASEOUS EFFLUENTS

This invention relates to a process for purifying gaseous effluents containing aldehydes.

In many factories such as for instance rendering plants, the presence of aldehydes in gaseous effluents is a significant cause of pollution resulting in the production of unpleasant odors. To expel such odors, gaseous effluents must be submitted to appropriate treatment intended particularly for eliminating aldehydes. A known treatment consists in submitting the gases to a washing operation by means of an aqueous solution of a bisulfite which with the aldehydes form water-soluble complexes. However, this process is relatively expensive because of the significant consumption of bisulfite which is essentially due to self-oxidation of that compound.

The present invention relates to a simple and inexpensive process for eliminating aldehydes from gaseous effluents.

The process according to the invention comprises submitting the gaseous effluents to the simultaneous action of sulphurous anhydrides and ammonia followed by washing with water.

According to the invention a predetermined quantity of $SO_2$ and/or $NH_3$ is introduced into the gas to be purified so that it simultaneously contains $SO_2$ and $NH_3$ and the resulting mixture is simply washed with water. Preferably the water flowing from the washing apparatus is recycled to the inlet thereof.

The quantities of $SO_2$ and $NH_3$ required for carrying out this invention depend on the quantities of aldehydes which are to be eliminated. In the case of an aldehyde concentration of the order of 25 ppm by volume, advantageously 50 to 500 ppm of $SO_2$ and 100 to 1000 ppm of ammonia are used.

The ratio of the required quantities of ammonia and $SO_2$ is preferably about 2:1 or between 2:1 and 3:1.

Obviously, when the gas to be purified naturally contains ammonia, as is for instance the case in rendering plants, the quantity of ammonia to be added to the gas can be reduced accordingly. If the quantity of ammonia present in the gas is sufficient, the mere addition of $SO_2$ thereto will produce the desired purification. Conversely, when the gas to be treated naturally contains $SO_2$, it might be sufficient to add only ammonia thereto.

An advantageous supply of $SO_2$ might consist of combustion gases produced in the plant. Thus, when there is a boiler consuming fuel, the combustion gases therefrom contain $SO_2$ and can be mixed with the gas to be purified. In this way, purification of the combustion gases is simultaneously obtained.

It has been observed that with gaseous effluents such as for instance those from rendering plants, the most favourable ratio of the quantities of $SO_2$ and $NH_3$ would correspond to a pH of the washing water of between 7 and 7.5. In such case, the supply of $SO_2$ (and/or $NH_3$) can be controlled depending on the pH of the water.

The process according to this invention has the following advantages in addition to those already mentioned:

simultaneous elimination of several pollutants ($NH_3$, $SO_2$, aldehydes);

easy regulation obtained by servo-control of the valves controlling the $SO_2$ and $NH_3$ feed as a function of the concentration of aldehyde or, as the case may be, of the pH of washing water;

easy control as a function of the concentration of polluting substances;

little consumption of washing water which is continuously recycled;

use of a washing apparatus having smaller dimensions than those in known bisulfite processes.

The following examples illustrate the invention.

EXAMPLE 1

Air containing 95.3 mg/$m^3$ of n-butyraldehyde is mixed with 60 ppm of $SO_2$ and 130 ppm of $NH_3$ and supplied at the rate of 100 $m^3$/h to a packed washer fed with circulating recycled water at a rate of 345 l/h. It is noted that at the washer outlet 90% of n-butyraldehyde was eliminated.

For comparison purposes, water to the washer was replaced by a solution containing 2% sodium bisulfite and the same gas was treated without addition of $SO_2$ and $NH_3$. The purification is then only 72%.

EXAMPLE 2

Air containing 94.1 mg/$m^3$ of n-butyraldehyde is treated as in example 1, however with addition of 400 ppm of $SO_2$ and 800 ppm of $NH_3$. The purification obtained is then 96% of n-butyraldehyde.

It is to be understood that the present invention has only been described in a purely explanatory and non-limitative way and any useful changes could be carried out without departing from its scope as defined in the appended claims.

We claim:

1. A process for purifying aldehyde-containing air comprising submitting the air to the simultaneous action of small quantities of sulphurous anhydride ($SO_2$) and ammonia, followed by washing with water.

2. A process according to claim 1 for purifying aldehyde and ammonia-containing air comprising adding sulphurous anhydride thereto and washing with water.

3. A process according to claim 1 for purifying aldehyde and $SO_2$ containing air comprising adding ammonia thereto and washing with water.

4. A process according to claim 1 comprising submitting the air to be purified to the simultaneous action of 2 to 20 volumes of sulphurous anhydride and 4 to 40 volumes of ammonia per unit of volume of aldehydes to be eliminated.

5. A process according to claim 1 wherein the ratio of the volumes of ammonia and $SO_2$ in the air submitted to washing with water is about 2:1.

6. A process according to claim 1 comprising controlling the ratio $NH_3/SO_2$ by maintaining the pH of the washing water at a value of between 7 and 7.5.

7. A process according to claim 1 comprising mixing with the air a combustion gas as a source of $SO_2$.

8. A process according to claim 1 wherein the volume ratio of $NH_3$ to $SO_2$ is between 2:1 and 3:1.

9. A process according to claim 1 wherein, based on the volume of air containing an aldehyde concentration on the order of 25 ppm, the small quantities of $SO_2$ and $NH_3$ comprise, respectively, 50–500 ppm and 100–1000 ppm.

10. A process of purifying aldehyde-containing gaseous effluents comprising air, the process comprising mixing the aldehyde-containing air with $SO_2$ and $NH_3$ in amounts to provide about 50–500 ppm of $SO_2$ and 100–1000 ppm of $NH_3$ per approximately 25 ppm of aldehyde;

passing the resultant gaseous mixture to a washing apparatus and there washing said gaseous mixture with water, the pH of the washing water being maintained between 7 and 7.5 by control of the supply of the quantities of $SO_2$ and $NH_3$; and recycling wash water from the washing apparatus outlet to its inlet.

* * * * *